US012273630B2

(12) United States Patent
Nishida et al.

(10) Patent No.: US 12,273,630 B2
(45) Date of Patent: Apr. 8, 2025

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventors: Tokuro Nishida, Kanagawa (JP); Kengo Takeuchi, Kanagawa (JP); Hiroyuki Hasegawa, Chiba (JP); Kazuya Kitamura, Kanagawa (JP); Koki Nakamura, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 22 days.

(21) Appl. No.: 18/153,500

(22) Filed: Jan. 12, 2023

(65) Prior Publication Data
US 2023/0300474 A1 Sep. 21, 2023

(30) Foreign Application Priority Data
Jan. 19, 2022 (JP) .................. 2022-006784

(51) Int. Cl.
H04N 23/80 (2023.01)
(52) U.S. Cl.
CPC ................... *H04N 23/80* (2023.01)
(58) Field of Classification Search
CPC ............. H04N 23/80; H04N 13/218; H04N 2013/0081; H04N 5/272; G06T 1/20; G06T 1/60
See application file for complete search history.

(56) References Cited

U.S. PATENT DOCUMENTS 5,752,115 A * 5/1998 McIntyre .............. G02B 7/32
396/431
2011/0025827 A1 2/2011 Shpunt et al.
(Continued)

FOREIGN PATENT DOCUMENTS

JP 2001169308 A 6/2001
JP 2015233270 A 12/2015
(Continued)

OTHER PUBLICATIONS

The May 28, 2024 Japanese Office Action, which is enclosed without an English Translation, that issued in Japanese Patent Application No. 2022-006784.
(Continued)

Primary Examiner — Yogesh K Aggarwal
(74) Attorney, Agent, or Firm — Cowan, Liebowitz & Latman, P.C.

(57) ABSTRACT

An image processing apparatus comprising: a plurality of output units outputting arithmetic operation results; a memory storing instructions; and a processor executing the instructions causing the image processing apparatus to: acquire images from a plurality of mutually different viewpoints, perform an arithmetic operation for converting the acquired images into distance information, and perform control to output arithmetic operation results from the plurality of output units, wherein the processor assigns the plurality of arithmetic operation results requiring different amounts of arithmetic operation obtained in the arithmetic operation process to the plurality of output units, and selectively switches the arithmetic operation results to be assigned in accordance with an operation condition of the image processing apparatus.

18 Claims, 11 Drawing Sheets

(56) References Cited

U.S. PATENT DOCUMENTS

2015/0120722 A1 4/2015 Martín Martínez
2019/0138834 A1 5/2019 Collet Romea
2019/0318495 A1* 10/2019 Otsubo ................ H04N 13/239

FOREIGN PATENT DOCUMENTS

JP 2016156934 A 9/2016
JP 2021-048560 A 3/2021
WO 2020/108091 A1 6/2020

OTHER PUBLICATIONS

An Oct. 17, 2023 European Search Report, which is enclosed, that issued in European Patent Application No. 22210754.2.
A European Search Report issued on Jun. 14, 2023, which is enclosed, that issued in the corresponding European Patent Application No. 22210754.2.

* cited by examiner

FIG. 2A

NON-IMAGING PLANE PHASE DIFFERENCE SCHEME: PIXEL CONFIGURATION

| R  | Gr | R  | Gr | R  | Gr | R  | Gr | R  | Gr |
|----|----|----|----|----|----|----|----|----|----|
| Gb | B  | Gb | B  | Gb | B  | Gb | B  | Gb | B  |

FIG. 2B

IMAGING PLANE PHASE DIFFERENCE SCHEME: PIXEL CONFIGURATION

| R<br>A | R<br>B | Gr<br>A | Gr<br>B | R<br>A | R<br>B | Gr<br>A | Gr<br>B | R<br>A | R<br>B | Gr<br>A | Gr<br>B | R<br>A | R<br>B | Gr<br>A | Gr<br>B | R<br>A | R<br>B | Gr<br>A | Gr<br>B |
|---|---|---|---|---|---|---|---|---|---|---|---|---|---|---|---|---|---|---|---|
| Gb<br>A | Gb<br>B | B<br>A | B<br>B | Gb<br>A | Gb<br>B | B<br>A | B<br>B | Gb<br>A | Gb<br>B | B<br>A | B<br>B | Gb<br>A | Gb<br>B | B<br>A | B<br>B | Gb<br>A | Gb<br>B | B<br>A | B<br>B |

FIG. 10A

| ARITHMETIC OPERATION MODE | EVF | SDI-1 | SDI-2 | HDMI |
|---|---|---|---|---|
| HIGH LOAD | CAPTURED IMAGE | DISTANCE IMAGE | CAPTURED IMAGE | DISTANCE LAYER |
| LOW LOAD | CAPTURED IMAGE | A IMAGE | B IMAGE | CAPTURED IMAGE |

FIG. 10B

| OPERATION MODE | EVF | SDI-1 | SDI-2 |
|---|---|---|---|
| NON-RECORDING | CAPTURED IMAGE | DISTANCE LAYER | CAPTURED IMAGE |
| RECORDING | CAPTURED IMAGE | DISTANCE IMAGE | CAPTURED IMAGE |

FIG. 10C

| LENS | EVF | SDI-1 | SDI-2 |
|---|---|---|---|
| COMPATIBLE | CAPTURED IMAGE | DISTANCE IMAGE | CAPTURED IMAGE |
| INCOMPATIBLE | CAPTURED IMAGE | A IMAGE | B IMAGE |

FIG. 10D

| LENS OPERATION | EVF | SDI-1 | SDI-2 |
|---|---|---|---|
| NOT-OPERATED | CAPTURED IMAGE | DISTANCE IMAGE | CAPTURED IMAGE |
| OPERATED | DEFOCUSED IMAGE | DISTANCE IMAGE | CAPTURED IMAGE |

IMAGE PROCESSING APPARATUS, IMAGE PROCESSING METHOD, AND STORAGE MEDIUM

BACKGROUND OF THE INVENTION

Field of the Invention

The present invention relates to an image processing apparatus, an image processing method, and a storage medium.

Description of the Related Art

Currently, there is a method called chroma key synthesis of making a part in an image with a specific color transparent and synthesizing a different image as an image synthesizing technology that is typically used in movies and televisions. When an image for chroma key synthesis is taken, it is necessary to prepare a background with a specific color such as a green screen or a blue screen and it is also necessary to perform operations of stretching wrinkles such that no color irregularity is generated in the background and adjusting illumination. Also, since it may be difficult to satisfactorily perform background separation if light reflected from the green screen appears on an imaging object, it may be necessary to perform an operation of canceling out the appearance of the reflected light in post-processing after the imaging. A series of these operations requires a significantly long time and human effort in a current situation.

On the other hand, there is a method of separating an imaging object from a background by using information regarding the distance to the imaging object and synthesizing the imaging object with another image as an image synthesis technique that has been used in recent years. If this method is used, there is no need to prepare a background such as a green back, and the aforementioned complicated work for chroma key synthesis is also not needed.

As a method for acquiring information regarding the distance to an imaging object, there is a method of measuring the distance to the imaging object using a distance measurement apparatus including a distance sensor separately from an image processing apparatus for capturing an image, for example. In such a case, angles of view and resolutions are different between the image processing apparatus and the distance measurement apparatus, optical axes of the image processing apparatus and the distance measurement apparatus do not coincide with each other, and it is necessary to perform calibration work before capturing an image in order to synthesis images in post-processing.

On the other hand, a technique in Japanese Patent Laid-Open No. 2021-048560, for example, is known as another method for acquiring information regarding the distance to an imaging object. Japanese Patent Laid-Open No. 2021-048560 discloses a technique for generating distance information indicating the distance from an image processing apparatus to an imaging object by using an imaging element that has a distance measurement function based on an imaging plane phase difference scheme. It is possible to simultaneously perform capturing of an image and generation of distance information with a single imaging element by using the technique, and it is thus not necessary to perform the aforementioned calibration work.

Incidentally, although Japanese Patent Laid-Open No. 2021-048560 provides a technique performed until the distance information is shown to a user after all arithmetic operations are performed within the imaging device, in general performing all the arithmetic operations within the imaging device tends to increase the amount of arithmetic operation required. If this is applied to video processing, in particular, this may not be possible unless the resolution is reduced or the frame rate is lowered. On the other hand, there is also an idea that the imaging device is caused to play a minimum role, an image that can be captured is output to the outside of the imaging device, and various kinds of correction processing and the like are performed in a workflow of a video processing PC or the like in a later stage, in the current field of video production. In such a current situation, it is desirable that what processing the imaging device is in charge of and what processing the video processing workflow in a later stage is in charge of be able to be arbitrarily selected in accordance with a user's need and an environment.

SUMMARY OF THE INVENTION

The present invention was made in view of the above circumstances and provides an image processing apparatus capable of selectively outputting a result of image processing.

An image processing apparatus according to an embodiment of the present invention includes: a plurality of output units outputting arithmetic operation results; a memory storing instructions; and a processor executing the instructions causing the image processing apparatus to: acquire images from a plurality of mutually different viewpoints; perform an arithmetic operation for converting the acquired images into distance information; and perform control to output arithmetic operation results from the plurality of output units, wherein the processor assigns the plurality of arithmetic operation results requiring different amounts of arithmetic operation obtained in an arithmetic operation process to the plurality of output units and selectively switches the arithmetic operation results to be assigned in accordance with an operation condition of the image processing apparatus.

Further features of the present invention will become apparent from the following description of exemplary embodiments (with reference to the attached drawings).

BRIEF DESCRIPTION OF THE DRAWINGS

FIG. 2A is a diagram illustrating an example of a color filter disposed on a light receiving surface of an imaging element; FIG. 2B is a diagram illustrating an example in which two photoelectric conversion units (photodiodes) are disposed in each pixel in a manner corresponding to alignment of the color filter in FIG. 2A.

FIGS. 10A to 10D are drawings of output switching patterns according to the first embodiment.

DESCRIPTION OF THE EMBODIMENTS

First Embodiment

Hereinafter, an embodiment for carrying out the present invention will be described with reference to the drawings and the like. However, the following embodiment is not intended to limit the invention according to the claims, and all the features described in the following embodiment are not necessarily essential for the present invention. Note that the image in the following embodiment includes not only a stationary image but also a video such as a moving image.

Figure 1:
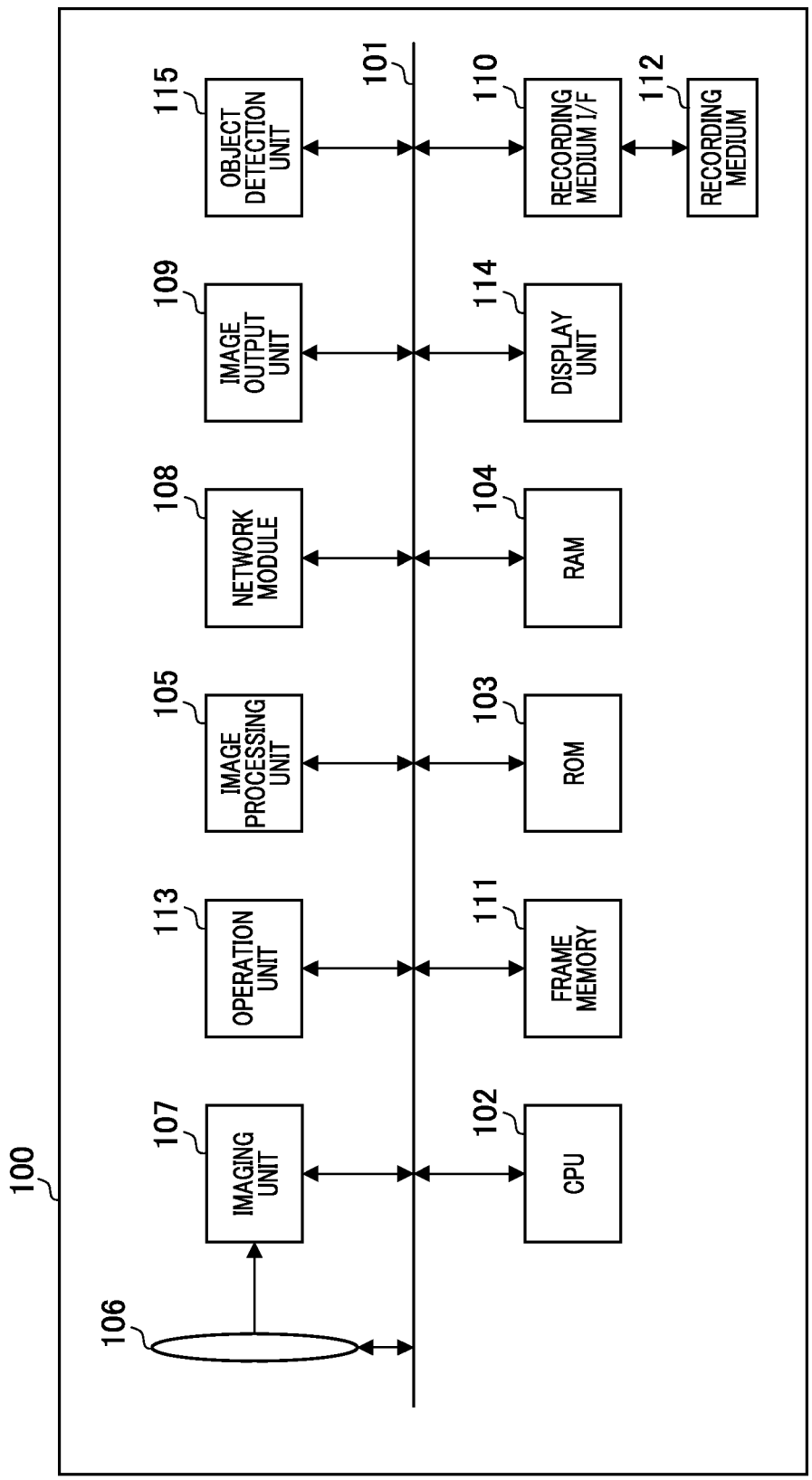
FIG. 1 is a schematic block diagram illustrating a hardware configuration example of an image processing apparatus.

First, a system as an assumption of the present invention will be described. FIG. 1 is a schematic block diagram illustrating a hardware configuration example of an image processing apparatus 100. In the drawing, the image processing apparatus 100 is an apparatus capable of performing an input, an output, and recording of videos.

In FIG. 1, a CPU 102 that is a computer, a ROM 103, a RAM 104, an image processing unit 105, a lens unit 106, an imaging unit 107, a network module 108, and an image output unit 109 are connected to an internal bus 101. Also, a recording medium interface (I/F) 110, an object detection unit 115, and the like are connected to the internal bus 101. Each block connected to the internal bus 101 is configured to be able to exchange data with the others via the internal bus 101.

Note that some of the blocks illustrated in FIG. 1 are realized by causing the CPU that is a computer included in the image processing apparatus to execute a computer program stored in a memory as a storage medium, such as a ROM. However, some or all of them may be realized by hardware. As the hardware, it is possible to use an application specific integrated circuit (ASIC), a processor (a reconfigurable processor or a DSP), or the like. Also, the blocks illustrated in FIG. 1 may not be incorporated in the same casing and may be configured by different devices connected to each other via signal paths.

The lens unit 106 is a unit including a lens group including a zoom lens and a focus lens, a diaphragm mechanism, a drive motor, and the like. An optical image that has passed through the lens unit 106 is formed on a light receiving surface of the imaging unit 107. The imaging unit 107 functions as an image acquisition section that acquires an image including an imaging object, includes an imaging element such as a CCD image sensor or a CMOS image sensor, and plays a role in replacing an optical signal with an electrical signal. The electrical signal obtained here is an analog value, the imaging unit 107 also has a function of converting the analog value into a digital value. Note that the imaging element in the present embodiment is a sensor having an image plane phase difference detection function, and details thereof will be described later.

The CPU 102 controls each component in the image processing apparatus 100 using the RAM 104 as a work memory in accordance with the computer program stored in the ROM 103. The ROM 103 is a non-volatile semiconductor memory and stores a computer program, various adjustment parameters, and the like for causing the CPU 102 to operate. The RAM 104 is a volatile memory using a semiconductor device, and a memory having a lower speed and lower capacity than those of a frame memory 111 is typically used.

The frame memory 111 is a semiconductor device capable of temporarily retaining an image signal and reading as needed. Since the image signal has a huge amount of data, a semiconductor device with a high frequency band and high capacity is required. Here, dual data rate 4-synchronous dynamic RAM (DDR4-SDRAM) or the like is used. It is possible to perform processing of synthesizing images that differ in times, cutting only necessary regions, and the like, for example, by using the frame memory 111.

The image processing unit 105 performs various kinds of image processing on data from the imaging unit 107 or image data stored in the frame memory 111 or a recording medium 112 on the basis of control performed by the CPU 102. The image processing performed by the image processing unit 105 includes pixel interpolation of image data, coding processing, compression processing, decoding processing, enlargement/downsizing processing (resizing), noise reduction processing, color conversion processing, and the like.

Also, the image processing unit 105 performs correction processing such as correction of variations in pixel properties in the imaging unit 107, correction of defective pixels, white balance correction, luminance correction, and correction of distortion and a decrease in peripheral light amount caused by lens properties. The image processing unit 105 generates distance information, and details thereof will be described later. Note that the image processing unit 105 may be configured of a dedicated circuit block for performing specific image processing. Also, the CPU 102 may also be able to perform image processing in accordance with a program without using the image processing unit 105 depending on the type of the image processing.

The CPU 102 controls the lens unit 106 and optically adjusts enlargement of the image, the focal distance, a diaphragm for adjusting the light amount, and the like, on the basis of an arithmetic operation result obtained by the image processing unit 105. Also, hand shaking correction may be performed by causing a part of the lens group to move within a plane that is orthogonal to an optical axis.

An operation unit 113 serves as an interface with the outside of the apparatus and receives an operation of a user. The operation unit 113 is configured of an element such as a mechanical button or a switch and includes a power switch, a mode switching switch, and the like.

A display unit 114 is a display device having a function of displaying an image such that the user can visually recognize it. For example, it is possible to check an image processed by the image processing unit 105, a setting menu, and an operation condition of the image processing apparatus 100. The display unit 114 uses, as a display device, a small-sized low-power-consuming device such as a liquid crystal display (LCD) or an organic electro luminescence. Furthermore, the display unit 114 may have a touch panel structure using a thin film element of a resistive film scheme, an electrostatic capacitance scheme, or the like and may be used as a part of the operation unit 113.

The CPU 102 generates a character sequence for informing the user of the setting state and the like of the image processing apparatus 100 and a menu for setting the image processing apparatus 100 and causes the display unit 114 to display the character sequence and the menu in a superimposed manner on the image processed by the image processing unit 105. In addition to the character information, it is possible to superimpose imaging assist display such as a histogram, a vector scope, a waveform monitor, a zebra, peaking, and a false color.

As another interface, the image output unit 109 is included. As a representative interface, a serial digital interface (SDI), a High Definition Multimedia Interface (HDMI) (registered trademark), or the like is employed. Alternatively, an interface such as Display Port (registered trademark) may be used. It is possible to display an image in real time on an external monitor via the image output unit 109.

Additionally, the network module 108 capable of transmitting not only an image but also a control signal is also included. The network module 108 is an interface for inputting and outputting image signals and sound signals. The network module 108 can also communicate with an external device via the Internet or the like and transmit and receive various kinds of data such as a file and a command. The network module 108 may be wireless or wired.

The image processing apparatus 100 has not only a function of outputting an image to the outside but also a function of recording it in the main body thereof. The recording medium 112 can record image data and various kinds of setting data, and a large-capacity storage element is used. Examples thereof include a hard disc drive (HDD), a solid state drive (SSD), and the like, and it can be attached to the recording medium I/F 110.

The object detection unit 115 is a block for detecting an object and performs object detection using, for example, artificial intelligence, representative examples of which include deep learning using a neural network. In a case where object detection based on deep learning is performed, the CPU 102 transmits a program for processing stored in the ROM 103, a network structure of an SSD, YOLO, and the like, weight parameters, and the like to the object detection unit 115.

Note that SSD is an abbreviation of Single Shot Multibox Detector, and YOLO is an abbreviation of You Only Look Once. The object detection unit 115 performs processing for detecting an object from an image signal and develops the processing result in the RAM 104 on the basis of various parameters obtained from the CPU 102.

FIG. 2A is a diagram illustrating an example of color filters disposed on the light receiving surface of the imaging element. FIG. 2A illustrates an example of Bayer layout of red (R), blue (B), and green (Gb, Gr), a plurality of pixels are two-dimensionally arranged in the imaging element, and any of the color filters R, B, Gb, and Gr is arranged on the front surface of each pixel as in FIG. 2A. Although only the color filter layouts in only two rows are illustrated in FIG. 2A, the color filters are repeatedly arranged in every two rows in the vertical scanning direction.

Also, a micro-lens is disposed on the front surface of the color filter disposed on the front surface of each pixel of the imaging element, and each pixel has two photoelectric conversion units (a photodiode A and a photodiode B) disposed in a line in the horizontal scanning direction.

FIG. 2B is a diagram illustrating an example in which two photoelectric conversion units (photodiodes) are disposed in a corresponding manner to the layout of the color filters in FIG. 2A. In FIG. 2B, each pixel is configured of a pair of a photodiode A and a photodiode B, and color filters of the same color are disposed for the pair of two photodiodes. Note that the photodiode A and the photodiode B receive light fluxes from different exit pupils in the optical system via the micro-lens, respectively.

The imaging element in the present embodiment can acquire an A image signal from a plurality of photodiodes A of pixels aligned in the row direction. Similarly, it is possible to acquire a B image signal from a plurality of photodiodes B of pixels aligned in the row direction. These A image signal and the B image signal are processed as signals for phase difference detection.

In other words, the CPU 102 or the image processing unit 105, for example, computes a correlation between the A image signal and the B image signal, detects a phase difference between the A image signal and the B image signal, and computes an imaging object distance on the basis of the phase difference. In other words, the CPU 102 or the image processing unit 105 functions as a distance information acquisition section that acquires distance information indicating the distance to the imaging object.

Note that it is also possible to acquire a signal for images (the A image signal+the B image signal) obtained by adding the signals from the two photodiodes A and B of each pixel. The signal for an image obtained through the addition is processed as a color image signal in accordance with the Bayer layout illustrated in FIG. 2A by the image processing unit 105.

Although the imaging unit 107 can output the phase difference detection signals (the A image signal and the B image signal) for each pixel, it is also possible to output values obtained by acquiring an average through addition of A image signals of a plurality of adjacent pixels and acquiring an average through addition of B image signals of a plurality of adjacent pixels. It is possible to shorten the time to read signals from the imaging unit 107 and to save the band of the internal bus 101 by outputting the values obtained by acquiring averages through addition.

The CPU 102 or the image processing unit 105 computes a correlation between the two image signals using the output signals from the imaging unit 107 including such an imaging element and calculates a defocusing amount, disparity information, and various kinds of information such as reliability on the basis of the phase difference between the two image signals. The defocusing amount on the light receiving surface is calculated on the basis of deviation (phase difference) between the A image signal and the B image signal. The defocusing amount has positive and negative values, and it is possible to ascertain which of front focus and a back focus the current defocusing corresponds to depending on which of a positive value and a negative value the defocusing amount is.

Also, it is possible to ascertain a level to focusing depending on the absolute value of the defocusing amount, and the defocusing amount of zero indicates focusing. In other words, the CPU 102 calculates information regarding which of front focus and back focus the current defocusing is on the basis of which of a positive value and a negative value the defocusing amount is and calculates focusing level information that is a level of focusing (amount of focus deviation) on the basis of the absolute value of the defocusing amount. The information regarding which of the front focus and the back focus the current defocusing corresponds to is output in a case where the defocusing amount exceeds a predetermined amount, and information indicating that focusing has been achieved is output in a case where the absolute value of the defocusing amount is within a predetermined value.

The CPU 102 controls the lens unit 106 in accordance with the defocusing amount and performs focus adjustment. Also, the CPU 102 calculates the distance to the imaging object using a principle of triangulation from the phase difference information and lens information of the lens unit 106.

In FIG. 2, the example in which pixels each including two photodiodes as photoelectric conversion units arranged with respect to one micro-lens are aligned in arrays has been described. However, each pixel may have a configuration in which three or more photodiodes as photoelectric conversion units are arranged with respect to one micro-lens. Also, all pixels may not have a configuration as described above, and pixels for detecting the distance may be discretely arranged in a plurality of two-dimensionally arranged pixels for detecting an image, for example.

In such a case, the pixels for detecting the distance may have a configuration including two photodiodes as described above, or each pixel for detecting the distance may have a configuration including only one of the photodiode A and the photodiode B. In a case where only one of the photodiode A and the photodiode B is included, the photodiode A and the photodiode B are arranged such that images of different exit pupils in the lens unit are incident. Alternatively, a light flux of one of them is blocked. In this manner, it is only necessary for the present embodiment to be configured such that two image signals from which a phase difference can be detected, such as the A image signal and the B image signal, are obtained, and the present embodiment is not limited to the pixel structure as described above. Also, the imaging unit 107 may be a so-called stereo camera including two imaging elements with disparity.

Figure 3:
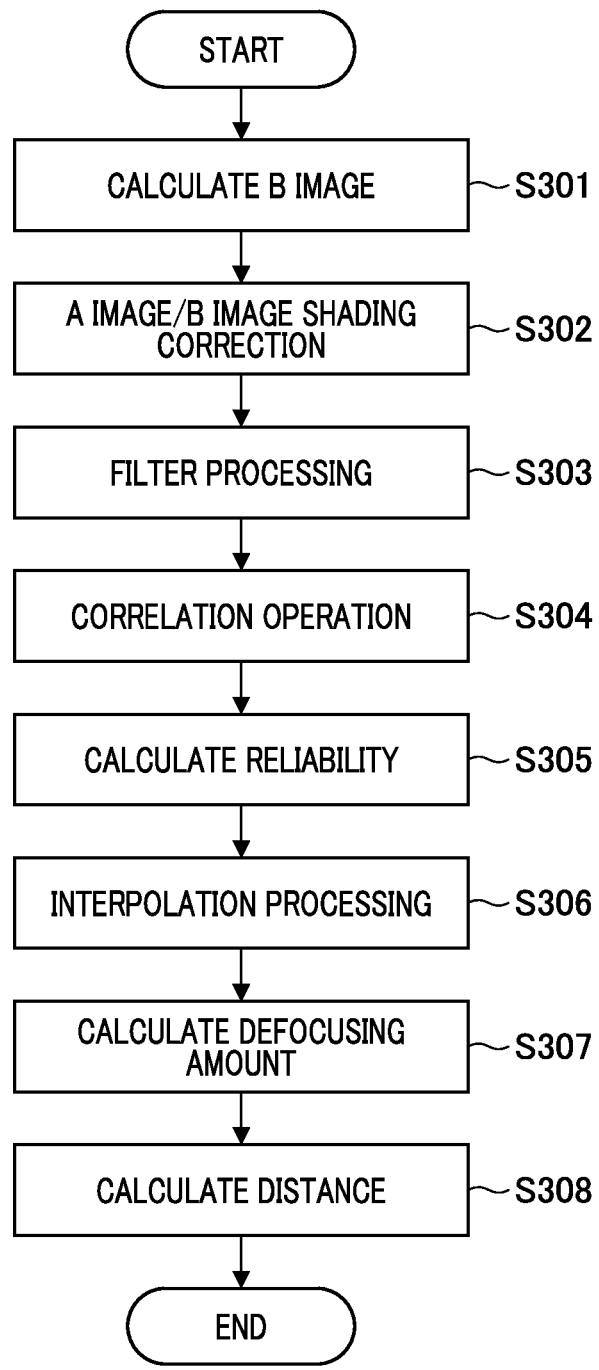
FIG. 3 is a flowchart for explaining processing of generating distance information.

Next, distance information generation processing will be described using FIGS. 3 to 5. FIG. 3 is a flowchart for explaining the distance information generation processing. Note that an operation in each step in the flowchart in FIG. 3 is performed by the CPU 102 as a computer executing the computer program stored in the ROM 103 or the like as a storage medium.

In the flowchart in FIG. 3, the imaging unit 107 reads and thereby acquires two signals, namely (the A image signal+ the B image signal) for capturing an image and the A image signal for detecting a phase difference first. Then, in Step S301, the image processing unit 105 calculates the B image signal for detecting a phase difference by obtaining a difference between (the A image signal+the B image signal) and the A image signal.

Note that the example in which the B signal is calculated by reading (the A image signal+the B image signal) and the A image signal and computing the difference therebetween in Step S300 and Step S301 above has been described. However, each of the A image signal and the B image signal may be read from the imaging unit 107. Also, in a case where two image sensors are included as in a stereo camera, image signals output from the image sensors may be processed as the A image signal and the B image signal.

In Step S302, optical shading correction is performed on each of the A image signal for detecting a phase difference and the B image signal for detecting a phase signal. In Step S303, filtering processing is performed on each of the A image signal for detecting a phase difference and the B image signal for detecting a phase difference. For example, reduction is cut by a high pass filter configured by FIR. Note that the signals may be caused to pass through each of a band pass filter and a low pass filter with changed filter coefficients. FIR is an abbreviation of Finite Impulse Response.

Next, the A image signal for detecting a phase difference and the B image signal for detecting a phase difference on which the filtering processing has been performed in Step S303 are split into minute blocks, and a correlation operation is performed thereon in Step S304. Note that the size or the shape of the minute blocks is not limited and regions may overlap between adjacent blocks.

Hereinafter, a correlation operation of the A image signal and the B image signal, which are a pair of images, will be described. Signal sequences of the A image signal at the pixel position of interest will be described as E(1) to E(m), and signal sequences of the B image signal at the pixel position of interest will be described as F(1) to F(m). The amount of correlation C(k) with the amount of deviation k between the two signal sequences is computed using Expression (1) while causing the signal sequences F(1) to F(m) of the B image signal to deviate relative to the signal sequences E(1) to E(m) of the A image signal.

$$C(k)=\Sigma |E(n)-F(n+k)| \quad (1)$$

In Expression (1), the $\Sigma$ operation means an arithmetic operation for calculating a sum for n. In the E operation, a range that n and n+k take is limited to a range from 1 to m. The amount of deviation k is an integer value and the amount of relative pixel deviation in units of detection pitches of a pair of data items.

Figure 4:
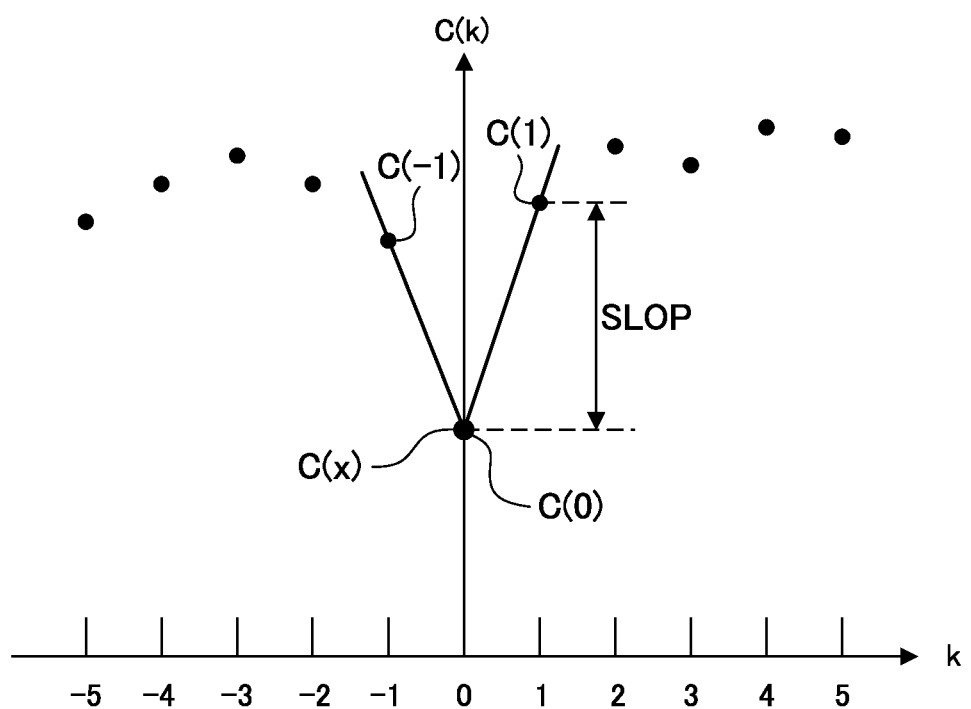
FIG. 4 is a diagram illustrating an arithmetic operation result of Expression (1) in a case where correlation of a pair of image signal sequences is high in an ideal state where no noise is present.

FIG. 4 is a diagram illustrating an arithmetic operation result of Expression (1) in a case where a correlation of a pair of image signal sequences is high in an ideal state where no noise is present. As illustrated in FIG. 4, the amount of correlation C(k) which is a difference is minimum with the amount of deviation (k=kj=0) with the high correlation of the pair of image signal sequences. Hereinafter, k when the discrete amount of correlation C(k) is minimum will be described as kj. Three-point insertion processing represented by Expressions (2) to (4) is performed to calculate x that gives the minimum value C(x) for successive amounts of correlation. Note that the amount of pixel deviation x is a real number, and its unit is pixel.

$$X = kj + \frac{D}{SLOP} \quad (2)$$

$$D = \frac{\{C(kj-1) - C(kj+1)\}}{2} \quad (3)$$

$$SLOP = \mathrm{MAX}\{C(kj+1) - C(kj), C(kj-1) - C(kj)\} \quad (4)$$

In Expression (4), SLOP represents an inclination of the minimum and very small amount of correlation and the amount of correlation which is adjacent thereto. In FIG. 4, it is assumed that $$C(kj)=C(0)=1000$$

$$C(kj-1)=C(-1)=1700$$

$$C(kj+1)=C(1)=1830$$

in a specific example.

In this example, kj=0. From Expressions (2) to (4),
SLOP=830
x=−0.078 pixel.

Note that in a case of a focused state, an ideal value of the amount of pixel deviation with respect to the A image signal sequences and the B image signal sequences is 0.00.

Figure 5:
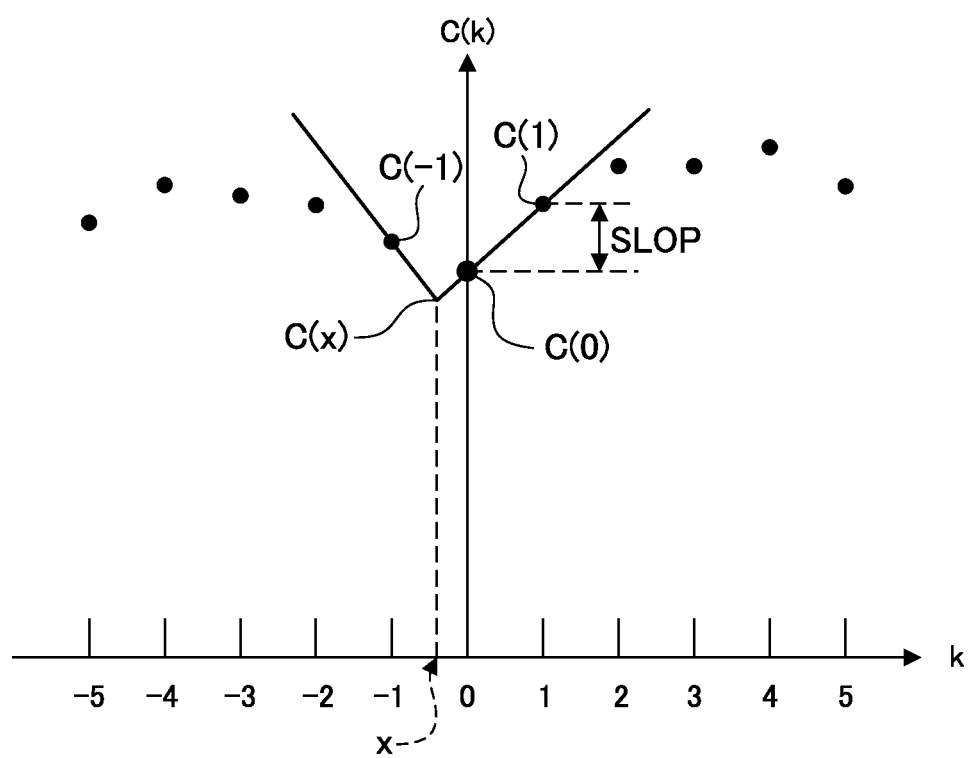
FIG. 5 is a diagram illustrating an arithmetic operation result in a case where Expression (1) is applied to a minute block where noise is present.

On the other hand, FIG. 5 is a diagram illustrating an arithmetic operation result in a case where Expression (1) is applied to a minute block where noise is present. As illustrated in FIG. 5, the correlation between the A image signal sequences and the B image signal sequences decreases due to an influence of noise that is randomly distributed. The minimum value of the amount of correlation C(k) is smaller than the minimum value illustrated in FIG. 4, and the curve of the amount off correlation has a flat shape (a shape with a small absolute value of a difference between the maximum value and the minimum value) as a whole.

In FIG. 5, it is assumed that $C(kj)=C(0)=1300$ $C(kj-1)=C(-1)=1480$ $C(kj+1)=C(1)=1800$.

In this example, kj=0. From Expressions (2) to (4),
SLOP=−500
x=−0.32 pixel.
In other words, the amount of pixel deviation x is separated from an ideal value as compared with the arithmetic operation result in the state where no noise is present as illustrated in FIG. 4.

In a case where the correlation between the pair of image signal sequences is low, the amount of change in amount of correlation C(k) becomes small, the curve of the correlation amount has a flat shape as a whole, and the SLOP value thus becomes small. Also, in a case where an imaging object image has a low contrast, the correlation between the pair of image signal sequences similarly becomes low, and the curve of the amount of correlation has a flat shape. It is possible to determine reliability of the calculated amount of pixel deviation x with the SLOP value on the basis of the characteristic. In other words, it is possible to determine that the correlation between the pair of image signal sequences is high in a case where the SLOP value is large and that a significant correlation has not been obtained between the pair of image signal sequences in a case where the SLOP value is small.

Note that since Expression (1) is used for the correlation operation in the present embodiment, the amount of correlation C(k) is minimum and very small with the amount of deviation with the highest correlation between the pair of image signal sequences. However, a correlation operation method in which the amount of correlation C(k) becomes maximum and very large with the amount with the highest correlation between the pair of image signal sequences may be used.

Next, reliability is calculated in Step S305. It is possible to calculate the reliability on the basis of C(kj) indicating a matching level between the two images calculated in Step S304 as described above and the SLOP value. Next, interpolation processing is performed in Step S306. There may be a case where although the correlation operation has been able to be performed in Step S304, it is not possible to employ it as the amount of pixel deviation since the reliability calculated in Step S305 is low.

In such a case, interpolation is performed from the amounts of pixel deviation calculated for peripheral pixels. As an interpolation method, a median filter may be applied, or an arithmetic operation of reducing the size of the data on the amount of pixel deviation and then enlarging it again may be performed. Also, color data may be extracted from (the A image signal+the B image signal) for capturing an image, and the amount of pixel deviation may be interpolated using the color data.

Next, in Step S307, the defocusing amount is calculated with reference to the amount x calculated in Step S304. Specifically, it is possible to obtain the defocusing amount (referred to as DEF) by Expression (5) below.

$$DEF = P \cdot x \tag{5}$$

In Expression (5), P denotes a conversion coefficient determined by a detection pitch (pixel arrangement pitch) and the distance between projection centers of two left and right viewpoints in a pair of disparity images, and the unit thereof is mm/pixel.

Next, in Step S308, the distance is calculated from the defocusing amount calculated in Step S307. When the distance to the imaging object is Da, the focal position is Db, and the focal distance is F, Expression (6) is approximately satisfied.

$$\frac{1}{Db} - \frac{1}{Da} = \frac{1}{F} \tag{6}$$

Therefore, the distance Da to the object is expressed by Expression (7).

$$Da = \frac{Db \cdot F}{F - Db} \tag{7}$$

Therefore, if it is assumed that Db when DEF=0 is Db0, then Expression (7) is expressed by Expression (8) below, and it is possible to obtain an absolute distance to the imaging object.

$$Da' = \frac{(Db0 - DEF) \cdot F}{F - (Db0 - DEF)} \tag{8}$$

On the other hand, since the relative distance is Da-Da', it is possible to obtain Expression (9) below from Expressions (7) and (8).

$$Da - Da' = \frac{DEF \cdot F^2}{(F - Db0)^2 + DEF \cdot (F - Db0)} \tag{9}$$

If the correlation operation is performed in accordance with the flowchart in FIG. 3 as described above, it is possible to calculate the amount of pixel deviation, the defocusing amount, and the distance information from the A image signal for detecting a phase difference and the B image signal for detecting a phase difference. In other words, it is possible to acquire the distance information on the basis of the phase differences among outputs of the plurality of photoelectric conversion units. Note that the distance information may be distance data itself or may be the shift amount or the defocusing amount, and the distance information may include them.

The processing until calculation of distance information using the A image signal for detecting a phase difference and the B image signal for detecting a phase difference has been described hitherto. Hereinafter, information generated in each process will be defined as follows to explain the present invention. The captured image is (the A image signal+the B image signal) for capturing an image. AB independent images are video signals of the A image signal for detecting a phase difference and the B image signal for detecting a phase difference as they are with no correction applied thereto, in particular. An image deviation image is information obtained by performing various kinds of correction on the AB independent images and two-dimensionally forming an image from the image deviation amount obtained by Expression (1). A defocused image is information obtained by two-dimensionally forming an image from the defocusing amount obtained by multiplying the image deviation image by a pixel pitch. A distance image is distance information obtained by adding information regarding an imaging optical system such as lens position information to the defocused image. A distance layer image is information obtained by providing a plurality of threshold values for numerical value information of the distance image, rounding numerical values near the threshold values to the threshold values, and expressing them as layers. In the image processing apparatus 100, the CPU 102 functions as an arithmetic operation section and a control section and realizes these arithmetic operations and image generation by controlling the image processing unit 105.

In the image processing apparatus 100 according to the present embodiment, the imaging unit 107 acquires images from a plurality of mutually different viewpoints, and the CPU 102 performs an arithmetic operation of converting the images acquired by the imaging unit 107 into distance information. Also, the image processing apparatus 100 includes the image output unit 109 configured of a plurality of output sections capable of outputting the acquired images and the distance information. The CPU 102 performs control for performing the arithmetic operations and outputting the arithmetic operation results from the image output unit 109.

Figure 6:
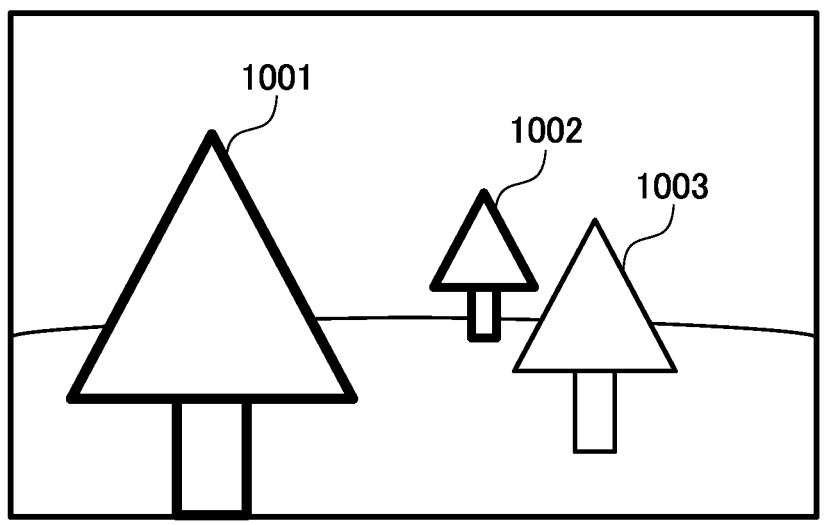
FIG. 6 is a diagram of a captured image according to a first embodiment.

FIG. 6 is a diagram of a captured image in the first embodiment. The captured image in the present embodiment will be described by exemplifying a landscape image in which trees are standing from the closer side to the further side. For example, it is assumed that the second tree 1003 from the closer side is focused while the closest tree 1001 and the furthest tree 1002 are in a slightly unfocused state.

Figure 7:
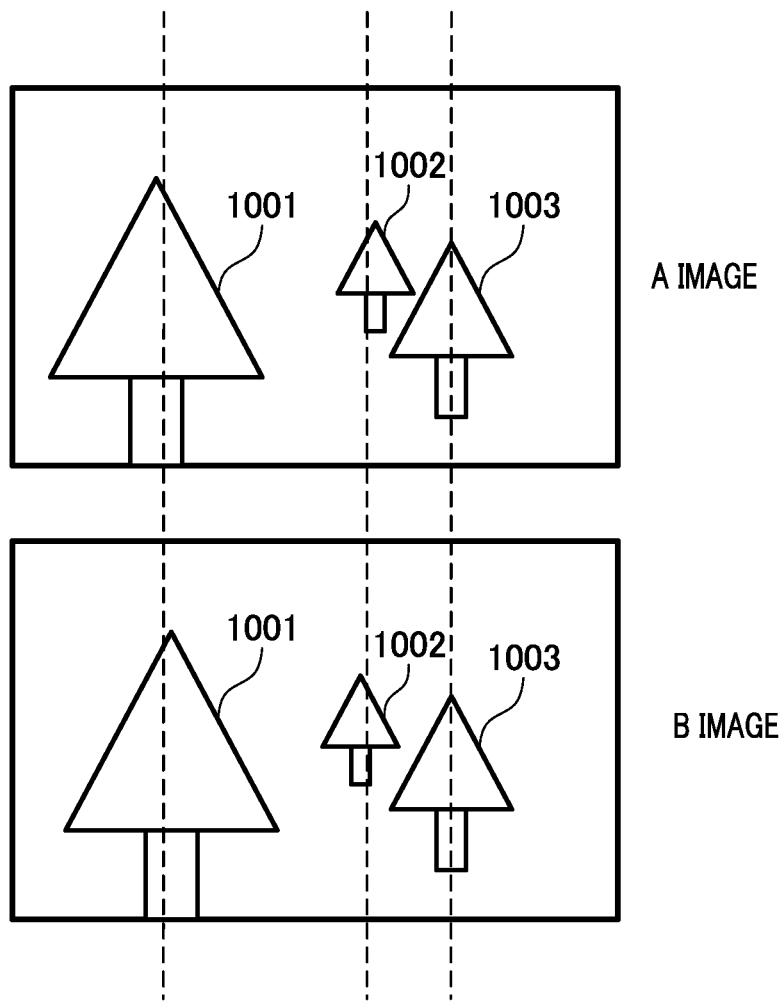
FIG. 7 is diagrams of an A image signal and a B image signal according to the first embodiment.

FIG. 7 is diagrams of the A image signal and the B image signal according to the first embodiment. It is possible to display the aforementioned landscape image as AB independent images, as illustrated in FIG. 7. In comparison between the two images, the second tree 1003 from the closer side is focused, and it is thus displayed at substantially the same positions in both the images of the A image signal and the B image signal. Since the closest tree 1001 and the furthest tree 1002 are in an unfocused state, deviation due to disparity is generated between the A image signal for detecting a phase difference and the B image signal for detecting a phase difference.

Figure 8:
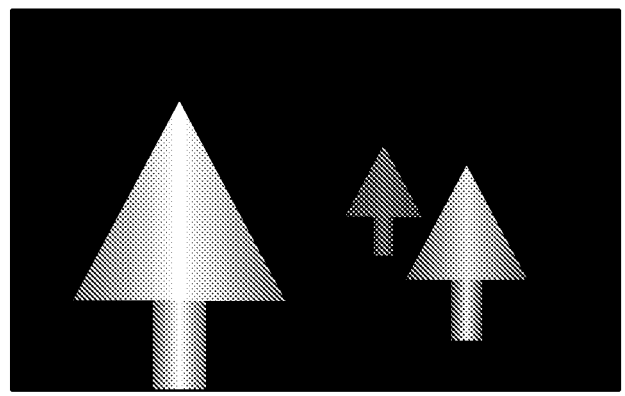
FIG. 8 is a diagram of an image deviation image, a defocused image, and a distance image according to the first embodiment.

FIG. 8 is a diagram of the image deviation image, the defocused image, and the distance image according to the first embodiment. If the image deviation image after the correlation operation is carried out is visualized, it is possible to display it as in FIG. 8. In the example in FIG. 8, the amount of image deviation (unit: pixel) is expressed by luminance, and a gray color is assumed to be the center value with the amount of image deviation of zero. Therefore, higher brightness or lower brightness indicates a larger amount of image deviation. In this example, a region that cannot be detected as the amount of image deviation is expressed by a black color. It is possible to convert the unit from pixel to mm by multiplying the image deviation image by the pixel pitch and to deal the thus obtained image as a defocused image. As display, it is possible to employ a showing fashion similar to that in FIG. 8. It is possible to generate distance image by adding information regarding the imaging optical system such as lens position information to the defocusing amount. As display, it is also possible to employ a showing fashion similar to that in FIG. 8 for this as well. FIG. 8 can be expressed not only by the luminance information but also by changing colors in a manner called a heat map.

Figure 9A:
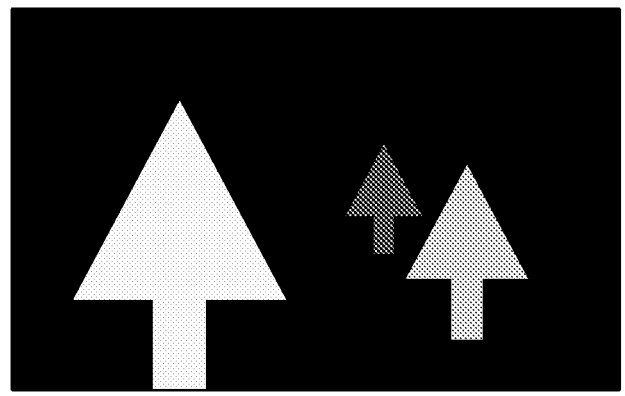
FIGS. 9A to 9B are diagrams of distance layer images according to the first embodiment.
Figure 9B:
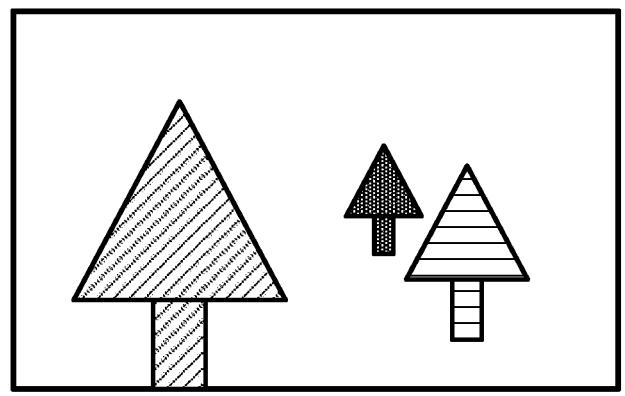

FIGS. 9A and 9B are diagrams of distance layer images according to the first embodiment. The distance layer images illustrated in FIGS. 9A and 9B include a concept of layers in the distance image, and an imaging object within a certain distance range is displayed by being applied to a single layer. Since the imaging object to be captured typically has irregularity, display as a distance layer image helps understanding when it is difficult to distinguish the imaging object in a distance image. FIG. 9A is an example of the distance layer image displayed by luminance information, and FIG. 9B is an example of a distance layer image represented by colors or markers.

Visualization of the information in each process until the distance information is acquired has been described hitherto. Next, description will be given by considering the image processing apparatus 100 as in FIG. 1 as a camera device. First, the display unit 114, the image output unit 109, and the network module 108 will be focused. The display unit 114 is a display unit that functions as a display section that displays various arithmetic operation results and is mounted directly in the image processing apparatus 100. The display unit 114 is also called an electric view finder (EVF) or the like and is an ocular monitor through which a cameraman constantly checks the captured image. Text information called on-screen display (OSD) is displayed in a superimposed manner on the captured image. In general, display on the display unit 114 is often displayed with resolution reduced from that when the imaging unit 107 captures the image.

The image output unit 109 displays the same captured image that is being viewed by the cameraman by being connected to a monitor installed at a slightly separated location with a cable connected thereto, and is used by a director of shooting, a person who provides an instruction for adjusting exposure, or the like. In general, the image processing apparatus 100 includes a plurality of output terminals as a plurality of output sections that the image output unit 109 has. For example, a captured image and OSD are transmitted to the first SDI terminal similarly to EVF, and an image with the maximum resolution and with no OSD and the like superimposed thereon is transmitted as an image for recording to the second SDI terminal. Additionally, a terminal for HDMI or the like is also included, and this is also often used to transmit an image for recording in a similar manner. The image processing apparatus 100 includes an additional small-sized sub-monitor or the like, such that the cameraman can use it for the purpose of checking the sub-monitor as a display section that is different from the display unit 114 in some cases.

Although the network module 108 often has a large transmission delay and an insufficient real-time property, the network module 108 is used to transmit images to a location at a far distance, receive control signals, and the like. The network includes connection with an Ethernet cable and wireless connection called Wi-Fi (registered trademark). In a case where the network is used, an image may be reduced, the frame rate may be lowered, and the image may then be transmitted for the purpose of lowering a data rate. These output sections are controlled by the CPU 102 of the image processing apparatus 100, and how to process the image before transmission is not limited to the above processing.

In the present embodiment, the information regarding the distance to the imaging object and the information that has been able to be acquired in the process are output to the outside of the device in order to improve convenience when the imaging object and another image are synthesized. The various output sections and images displayed thereon at the time of capturing images, in particular, change in accordance with a person who use them or a device connected in a later stage. Therefore, whether to distribute various images to the output means is determined in accordance with operation setting of the image processing apparatus 100. The output sections described here are the EVF, the SDI, the HDMI, and the network terminal described above, and the various images are the captured image, the AB independent images, the image deviation image, the defocused image, the distance image, and the distance layer image described above. The arithmetic operation results related to these images are the images from the plurality of mutually different viewpoints, the disparity information, the image deviation information, the defocusing information, the distance information, and the distance layer information.

FIGS. 10A to 10D are illustrations of output switching patterns according to the first embodiment. In an example, how to distribute images to be output is managed by a table as illustrated in FIGS. 10A to 10D in accordance with operation setting of the image processing apparatus 100.

FIG. 10A is an example of a table for switching an output scheme in accordance with an arithmetic operation mode. It is possible to perform control to selectively switch arithmetic operation results to be assigned in accordance with a setting value of the amount of arithmetic operation set by a user, by using FIG. 10A. A high-load mode is a mode in which setting for completely performing the processing until the arithmetic operation of the distance information in the image processing apparatus 100 is employed. A captured image is displayed on the EVF such that a cameraman can check it, distance information to be input to eternal recording or an external PC is output to the SDI-1, and a captured image to be input to the external recording or the external PC is output to the SDI-2. Distance layer image is output to the HDMI such that the cameraman can check the image while checking a sense of distance to the imaging object.

A low-load mode is a mode in which setting for executing only a minimum arithmetic operation in the image processing apparatus 100 is employed. As described above, various arithmetic operations are needed to calculate the distance information. Therefore, in a case where results with high precision are needed, it becomes necessary to realize the high precision by increasing types of arithmetic operations in the image processing unit 105 or using additional information from the object detection unit 115 and the like. In such a case, there may be a case where a problem occurs in capturing a video or the like if downsizing of the processed image, reduction of the frame rate, and the like are not performed. Therefore, it is possible to enable the low-load mode as well and to switch outputs to those on the assumption that only AB independent images requiring a small amount of arithmetic operation are output, connection to the external PC or the like is established, and the external PC is caused to execute the processing until the image processing and the arithmetic operation for the distance information calculation.

Although only the two types, namely the high-load mode and the low-load mode have been described here for easiness of explanation, the method to reduce the amount of arithmetic operation is not limited thereto. For example, various arrangements such as reduction of the relative amount of deviation in the correlation operation and omission of the auxiliary arithmetic operation for enhancing reliability are conceivable. In the high-load mode, although there is a fact that a high load is imparted on the image processing apparatus 100, it is possible to obtain useful information from other attached functional blocks, and it may thus be possible to perform an arithmetic operation with higher precision than the external PC.

FIG. 10B is an example of a table for switching an output scheme depending on which of a non-recording state and a recording state the image processing apparatus 100 is in. As illustrated in FIG. 10B, the output scheme may be switched in accordance with an operation condition of the image processing apparatus 100. It is possible to perform control to selectively switch the arithmetic operation results to be assigned in accordance with whether to save (record) the arithmetic operation results by using FIG. 10B. Non-recording means a so-called standby state and means a state in which actual imaging (recording) has not yet been started, such as a state of device parameter setting, imaged composition checking, or rehearsal. Non-recording can be applied in a case where it is desired to perform monitoring through a distance layer image with satisfactory visibility and save a distance image with a large amount of information in an external recording device at the time of recording or the like. In a case where a high-definition monitor is attached to the external recording device, convenience in such an output scheme is improved.

FIG. 10C is an example of a table for performing switching depending on whether or not the attached lens can be recognized by (is compatible with) the image processing apparatus 100. As illustrated in FIG. 10C, the table for the output scheme may be switched in accordance with the lens unit 106 of the image processing apparatus 100. If the type of the attached lens can be recognized, it is possible to use optical parameters saved in the ROM 103 in advance and thereby to perform processing until generation of the distance image. However, in a case where there is no lens information, it is difficult to generate the distance information, and the image processing apparatus 100 can address only up to the AB independent images. Also, even if optical parameters have been obtained, there may be a case where it is difficult to generate the distance image depending on the type of the lens such as a super-telephoto lens. Therefore, a configuration to apply a limitation as needed may be employed. It is possible to perform control to select arithmetic operation results that can be output in accordance with lens properties or an imaging object condition by using FIG. 10C. Here, the lens properties or the object condition include the type of the lens, the F value state, the imaging object contrast, and the like.

FIG. 10D is an example of a table for switching an output scheme in accordance with whether the attached lens is being operated (operated) or is not being operated (not-operated). It is possible to perform control to selectively switch the arithmetic operation results to be assigned in a case where the lens is being operated by using FIG. 10D. A person who operates the lens is mainly a cameraman, and the cameraman performs focusing (focus adjustment) in addition to adjustment of an angle of view. At this time, it is easier to perform the focus adjustment in the defocused image than in a captured image. In this manner, it is possible to switch the tables for the output schemes in accordance with the lens state.

Note that although not additionally described, it is also possible to use a network terminal as an output terminal for an image signal. These tables may be arbitrarily set by the user, and a configuration in which switching is also performed under conditions other than the aforementioned conditions may also be employed. Also, although not additionally described, the CPU 102 may perform control to selectively switch the arithmetic operation results to be assigned in accordance with a reading mode in the sensor. The switching of the output schemes in accordance with various settings and operation modes has been described hitherto.

Figure 11:
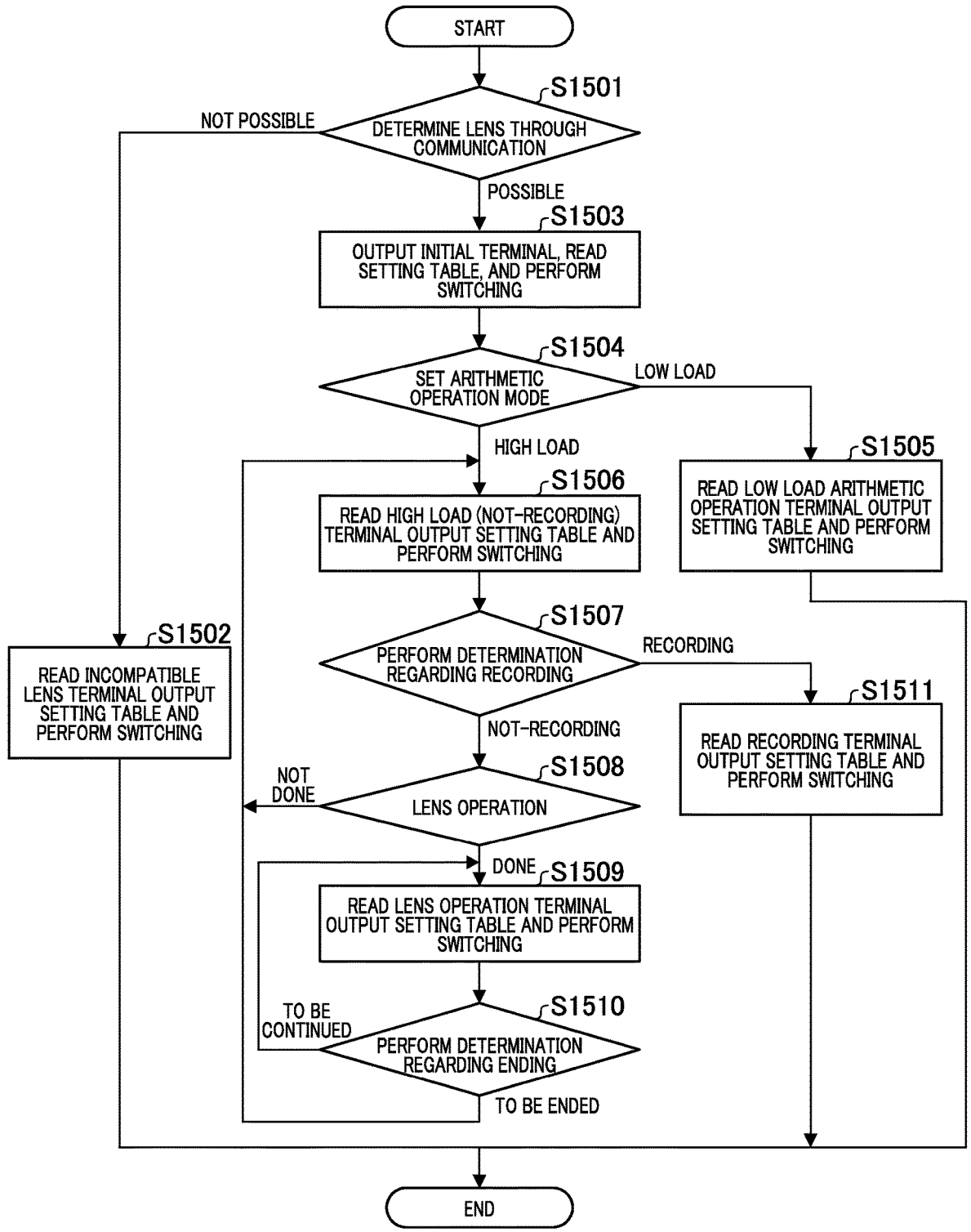
FIG. 11 is a flowchart according to the first embodiment.

FIG. 11 is a flowchart according to the first embodiment. Control to switch outputs will be described using FIG. 11. An operation in each step in the flowchart in FIG. 11 is performed by the CPU 102 executing the program stored in the ROM 103 or the like as a storage medium.

In Step S1501, the CPU 102 in the image processing apparatus 100 communicates with the lens unit 106. Here, whether the lens attached to the lens unit 106 is equal to that stored in the ROM 103 is checked. In a case where it is not possible to perform determination through communication or in a case where a lens that is not compatible and is not stored is attached thereto, the processing proceeds to Step S1502. On the other hand, in a case where it is possible to perform determination through communication and it is determined that the lens is compatible in Step S1501, the processing proceeds to Step S1503.

In Step S1502, the CPU 102 reads a setting table for non-compatible lens terminal outputs from the ROM 103. Then, control to switch operations of the image processing unit 105 and the image output unit 109 is performed.

In Step S1503, the CPU 102 performs control to read a setting table for initial terminal outputs from the ROM 103 and switch operations of the image processing unit 105 and the image output unit 109. Then, the processing proceeds to Step S1504.

In Step S1504, which of a high load and a low load an arithmetic operation mode setting state corresponds to is determined. In a case where the low-load mode has been selected in order to reduce a processing load of the image processing apparatus 100, the processing proceeds to Step S1505. On the other hand, in a case where the high load mode has been selected in Step S1504, the processing proceeds to Step S1506.

In Step S1505, the CPU 102 performs control to read a table for low-load arithmetic operation terminal outputs from the ROM 103 and switch operations of the image processing unit 105 and the image output unit 109.

In Step S1506, the CPU 102 performs control to read a setting table for non-recording terminal outputs from the ROM 103 and switch operations of the image processing unit 105 and the image output unit 109.

In Step S1507, whether or not recording has been started is determined. In a state where recording has not yet been started, the processing proceeds to Step S1508. On the other hand, it is determined that the recording has been started, the processing proceeds to Step S1511.

In Step S1508, a lens operation is detected. If the lens is not operated, the processing returns to Step S1506. If the lens is operated, the processing proceeds to Step S1509.

In Step S1509, the CPU 102 performs control to read a setting table for lens operation terminal outputs from the ROM 103 and switch operations of the image processing unit 105 and the image output unit 109. Thereafter, the processing proceeds to Step S1510.

In Step S1510, whether the lens operation is being continued or has ended is determined. If the lens operation is being continued, the processing returns to Step S1509. On the other hand, if the lens operation has ended, the processing returns to Step S1506.

In Step S1511, the CPU 102 performs control to read a setting table for recording terminal outputs from the ROM 103 and switch operations of the image processing unit 105 and the image output unit 109.

In the present embodiment, the CPU 102 assigns the plurality of arithmetic operation results requiring different amounts of arithmetic operation obtained in the arithmetic operation process to the plurality of output sections and selectively switches the arithmetic operation results to be assigned in accordance with an operation condition of the image processing apparatus 100. Here, the plurality of arithmetic operation results include an initial result, an intermediate result, and a final result. The plurality of arithmetic operation results can be saved in the recording medium 112 and also can be recorded in different regions. Therefore, a region where the initial result is saved may be a first saving section, a region where the intermediate result is saved may be a second saving section, and a region where the final result is saved may be a third saving section.

The initial result includes at least images from a plurality of mutually different viewpoints. The intermediate result is information obtained in the process until the CPU 102 acquires disparity information and computes distance information. The final result is the distance information. Also, the image processing apparatus 100 includes a conversion section that converts the distance information into distance layer information and is capable of outputting the distance layer information from the output sections. The CPU 102 can arbitrarily change the destination to which each arithmetic operation result is assigned. Here, the change of the destination of assignment may be performed on the basis of a user's setting.

In the present embodiment, the CPU 102 may perform control not to perform an auxiliary arithmetic operation for enhancing reliability of the distance information in accordance with the set amount of arithmetic operation and a frame rate. It is possible to improve the frame rate while reducing the amount of arithmetic operation by generating the distance information and the distance layer information in this manner.

In the present embodiment, the image processing apparatus 100 may be driven with a battery. Here, the display unit 114 may display that an arithmetic operation result requiring a smaller amount of arithmetic operation can be displayed in a case where the image processing apparatus 100 is driven with a battery. It is possible to save power consumption of the battery by reducing the amount of arithmetic operation.

Second Embodiment

A second embodiment of the present invention will be described. In the present embodiment, the same reference signs will be applied to configurations similar to those in the aforementioned embodiments, and description thereof will be omitted. In the first embodiment, the configuration in which operations of the image processing unit 105 and the image output unit 109 are switched using a table in accordance with operation setting of the image processing apparatus 100 has been described. In the present embodiment, a concept of reliability is used to employ the table. It is thus possible to enhance convenience of an output scheme of an output terminal.

For example, it is assumed that the CPU 102 has determined values such as SLOP described in FIGS. 4, 5, and the like and has determined that reliability of the entire screen is low. In such a case, the CPU 102 provides alert display for encouraging switching of a display method if an image that is being currently displayed is display of an arithmetic operation result of a distance image or the like. Alternatively, the CPU 102 performs processing of forcibly switching the image to a captured image or the like. The reason is that in FIG. 8, for example, black display is employed when there are many regions that cannot be computed and as a result, low reliability leads to an entirely black image or an image with a lot of noise. Since usability deteriorates in this case, processing of switching the display method is performed.

How to use the reliability may be arbitrarily determined by a user. In a case in which it is desired to capture an image with priority placed on persons, for example, the object detection unit 115 or the like is used to specify regions of persons, and reliability of the image is determined using the reliability in the regions of the persons. Alert display or forced switching may be performed in a case where the image is determined to have low reliability.

Note that information regarding the reliability (reliability information) is obtained from the intermediate result from among the plurality of arithmetic operation results. The CPU 102 functions as a reliability information acquisition section that acquires reliability information form the intermediate result and switches the arithmetic operation results to be assigned to the output sections in accordance with the reliability information. Note that the reliability information is determined by a correlation of images from a plurality of mutually different viewpoints.

As described hitherto, it is possible to select the output sections in accordance with a person who use it, an environment where it is used, and a system by switching the output scheme in accordance with various kinds of setting and operation modes. It is thus possible to efficiently carry out a series of works of separating an imaging object from a background and synthesizing the imaging object with another image.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-006784, filed Jan. 19, 2022, which is hereby incorporated by reference wherein in its entirety.

What is claimed is:

1. An image processing apparatus comprising:
a plurality of output units outputting arithmetic operation results;
a memory storing instructions; and
a processor executing the instructions causing the image processing apparatus to:
acquire images from a plurality of mutually different viewpoints;
perform an arithmetic operation for converting the acquired images into distance information; and
perform control to output the arithmetic operation results from the plurality of output units,
wherein the processor assigns a plurality of arithmetic operation results requiring different amounts of arithmetic operation obtained in an arithmetic operation process to the plurality of output units and selectively switches the arithmetic operation results to be assigned in accordance with an operation condition of the image processing apparatus, and
the processor selectively switches the arithmetic operation results to be assigned in accordance with a reading mode in a sensor.

2. The image processing apparatus according to claim 1, wherein the plurality of arithmetic operation results include an initial result, an intermediate result, and a final result.

3. The image processing apparatus according to claim 1, wherein the processor performs control for assigning the plurality of arithmetic operation results to the plurality of output units on the basis of a user's setting.

4. The image processing apparatus according to claim 1, further comprising:
a lens unit including a lens for forming an optical image, wherein the processor performs control for selectively switching the arithmetic operation results to be assigned in a case where the lens is operated.

5. The image processing apparatus according to claim 1, wherein the processor selects an arithmetic operation result that is able to be output from among the plurality of arithmetic operation results in accordance with lens properties or an imaging object condition.

6. The image processing apparatus according to claim 1, wherein the processor selectively switches the arithmetic operation results to be assigned in accordance with setting values of the amounts of arithmetic operations set by a user.

7. The image processing apparatus according to claim 1, wherein the processor further executes an instruction causing the image processing apparatus to
save the plurality of arithmetic operation results, and
selectively switch the arithmetic operation results to be assigned in accordance with whether or not to save the plurality of arithmetic operation results.

8. The image processing apparatus according to claim 1, wherein the processor performs control not to perform an auxiliary arithmetic operation for enhancing reliability of the distance information in accordance with a set amount of arithmetic operation and a frame rate.

9. The image processing apparatus according to claim 1,
wherein the processor further executes an instruction causing the image processing apparatus to display the plurality of arithmetic operation results, and
wherein the processor displays that arithmetic operation results requiring a smaller amount of arithmetic operation are able to be displayed in a case where the image processing apparatus is driven with a battery.

10. The image processing apparatus according to claim 2, wherein the initial result includes images at least from a plurality of mutually different viewpoints.

11. The image processing apparatus according to claim 2, wherein the intermediate result is information obtained in a process until the distance information is computed after disparity information is acquired.

12. The image processing apparatus according to claim 2, wherein the final result is the distance information.

13. The image processing apparatus according to claim 1, wherein the processor further executes an instruction causing the image processing apparatus to convert the distance information into distance layer information.

14. The image processing apparatus according to claim 1, wherein the processor is able to arbitrarily change a destination to which each of the arithmetic operation results is to be assigned.

15. The image processing apparatus according to claim 2,
wherein the processor further executes an instruction causing the image processing apparatus to acquire reliability information from the intermediate result, and
wherein the processor switches the arithmetic operation results in accordance with the reliability information.

16. The image processing apparatus according to claim 15, wherein the reliability information is determined by a correlation of images from a plurality of mutually different viewpoints.

17. An image processing method in an image processing apparatus including a plurality of output units capable of outputting distance information, the method comprising:
acquiring images from a plurality of mutually different viewpoints;
performing an arithmetic operation for converting the acquired images into distance information; and
assigning a plurality of arithmetic operation results requiring different amounts of arithmetic operation which are obtained in an arithmetic operation process to the plurality of output units, selectively switching the arithmetic operation results to be assigned in accordance with an operation condition of the image processing apparatus, and outputting the arithmetic operation results from the plurality of output units, and
selectively switching the arithmetic operation results to be assigned in accordance with a reading mode in a sensor.

18. A non-transitory storage medium on which is stored a computer program related to a method for controlling an image processing apparatus that includes a plurality of output units capable of outputting distance information, the method comprising:
acquiring images from a plurality of mutually different viewpoints;
performing an arithmetic operation for converting the acquired images into distance information; and
assigning a plurality of arithmetic operation results requiring different amounts of arithmetic operation which are obtained in an arithmetic operation process to the plurality of output units, selectively switching the arithmetic operation results to be assigned in accordance with an operation condition of the image processing apparatus, and outputting the arithmetic operation results from the plurality of output units, and
selectively switching the arithmetic operation results to be assigned in accordance with a reading mode in a sensor.

* * * * *